US010259724B2

(12) United States Patent
Carlotto (10) Patent No.: US 10,259,724 B2
(45) Date of Patent: Apr. 16, 2019

(54) APPARATUS FOR TREATING WATER OR LIQUIDS IN GENERAL

(71) Applicant: FEELFREE SRL, Cittadella (Padua) (IT)

(72) Inventor: Franco Carlotto, Cittadella (Padua) (IT)

(73) Assignee: FEELFREE SRL, Cittadella (Padua) (IT)

( * ) Notice: Subject to any disclaimer, the term of this patent is extended or adjusted under 35 U.S.C. 154(b) by 185 days.

(21) Appl. No.: 15/303,688

(22) PCT Filed: Feb. 9, 2015

(86) PCT No.: PCT/EP2015/000272
§ 371 (c)(1),
(2) Date: Oct. 12, 2016

(87) PCT Pub. No.: WO2015/158406
PCT Pub. Date: Oct. 22, 2015

(65) Prior Publication Data
US 2017/0029294 A1    Feb. 2, 2017

(30) Foreign Application Priority Data

Apr. 16, 2014    (IT) .................. VI2014A0112

(51) Int. Cl.
*C02F 1/44* (2006.01)
*B01D 61/04* (2006.01)
(Continued)

(52) U.S. Cl.
CPC ............ *C02F 1/441* (2013.01); *B01D 61/025* (2013.01); *B01D 61/04* (2013.01); *B01D 61/08* (2013.01);
(Continued)

(58) Field of Classification Search
CPC ................ B01D 61/08; B01D 2311/04; B01D 2311/06; B01D 2311/2626;
(Continued)

(56) References Cited

U.S. PATENT DOCUMENTS 4,086,166 A * 4/1978 Martin .................. B01D 37/04
                                                    210/257.2
4,482,456 A * 11/1984 Grayson ............... B01D 61/08
                                                      210/134

(Continued)

FOREIGN PATENT DOCUMENTS

EP          0438372 A2    7/1991

*Primary Examiner* — Terry K Cecil
(74) *Attorney, Agent, or Firm* — R. Neil Sudol; Henry D. Coleman (57) ABSTRACT

An apparatus for treating water or liquids in general, including a reverse osmosis filtration device provided with at least one inlet associated with a line for supplying the liquid to be treated, at least one outlet of the permeate associated with a line for dispensing the treated liquid and at least one concentrate outlet associated with a line for discharging the waste. The particularity of the present invention resides in that it includes, downstream of the filtration device, at least one tank that forms inside it two adjacent chambers with a mutually variable volume, in which one chamber is connected to the delivery line while the other chamber is connected to the discharge line.

9 Claims, 8 Drawing Sheets

(51) Int. Cl.
*B01D 61/02* (2006.01)
*B01D 61/58* (2006.01)
*B01D 61/10* (2006.01)
*B01D 61/12* (2006.01)
*B01D 61/14* (2006.01)
*B01D 61/08* (2006.01)
*C02F 9/00* (2006.01)
*C02F 1/28* (2006.01)

(52) U.S. Cl.
CPC ............ *B01D 61/10* (2013.01); *B01D 61/12* (2013.01); *B01D 61/145* (2013.01); *B01D 61/58* (2013.01); *C02F 9/005* (2013.01); *B01D 2311/04* (2013.01); *B01D 2311/06* (2013.01); *B01D 2313/125* (2013.01); *B01D 2313/18* (2013.01); *B01D 2313/21* (2013.01); *B01D 2313/24* (2013.01); *B01D 2313/246* (2013.01); *B01D 2313/44* (2013.01); *B01D 2319/02* (2013.01); *C02F 1/283* (2013.01); *C02F 1/444* (2013.01); *C02F 2201/003* (2013.01); *C02F 2201/004* (2013.01); *C02F 2201/005* (2013.01); *C02F 2201/006* (2013.01); *C02F 2209/40* (2013.01); *C02F 2307/10* (2013.01)

(58) Field of Classification Search
CPC ...... B01D 2311/2649; B01D 2313/125; B01D 2313/18; B01D 2313/21; B01D 2313/24; B01D 2313/246; B01D 2313/44; B01D 2319/02; B01D 61/025; B01D 61/04; B01D 61/10; B01D 61/12; B01D 61/145; B01D 61/58; C02F 1/441; C02F 1/283; C02F 1/444; C02F 2201/003; C02F 2201/004; C02F 2201/005; C02F 2201/006; C02F 2209/40; C02F 2307/10; C02F 9/005
USPC ....................................................... 210/257.2
See application file for complete search history.

(56) References Cited

U.S. PATENT DOCUMENTS

| | | | |
|---|---|---|---|
| 4,623,467 A | 11/1986 | Hamlin | |
| 4,657,674 A | 4/1987 | Burrows | |
| 4,705,625 A * | 11/1987 | Hart, Jr. | B01D 61/08 210/110 |
| 5,096,574 A * | 3/1992 | Birdsong | B01D 61/08 210/195.2 |
| 2004/0050786 A1* | 3/2004 | Dey | B01D 19/0031 210/640 |
| 2007/0256977 A1* | 11/2007 | Schmitt | B01D 61/025 210/652 |
| 2010/0116724 A1 | 5/2010 | Schmitt | |

* cited by examiner

APPARATUS FOR TREATING WATER OR LIQUIDS IN GENERAL

BACKGROUND OF THE INVENTION

The present invention relates to an apparatus for treating water or liquids in general.

As is known, in the households there is an increasingly frequent use of systems for treating potable water that are based on the principle of reverse osmosis.

The systems commonly used are substantially of two types: accumulation systems and direct production systems.

Differently from direct production systems, accumulation systems utilize the pressure of the water mains and produce the treated water drop by drop, i.e. the permeate, which is accumulated in a tank.

In greater detail, after passing through an activated carbon pre-filter in order to remove organic pollutants and chlorine-based compounds, the water to be treated encounters an osmosis membrane that separates the permeate from the waste; the permeate is sent to the tank while the waste is discharged.

In general, a conventional reverse osmosis accumulation apparatus also includes an activated carbon post-filter, followed by a UV ray lamp that has a germicidal action, all installed downstream of the accumulation tank.

In the prior art, accumulation occurs by means of expansion vessels with a capacity comprised between 12 and 24 liters.

Those expansion vessels contain a buffer volume tank of air under pressure that is separated from the chamber that contains the water by means of an elastomeric membrane.

Although they are advantageous in many respects and comply with their original purpose, reverse osmosis filtration systems with conventional accumulation have some critical aspects, which mainly reside in the characteristics of the accumulation tanks.

The causes of those drawbacks are to be attributed first of all to the fact that the useful volume of water that can be contained under pressure in each expansion vessel is comprised generally between one half and one quarter of the total volume of the vessel, depending on the pressure in the water mains and on the preloading.

In addition to this, it should be considered that the expansion vessel requires periodic maintenance in order to check the preloading pressure which, if necessary, must be topped up.

Also, during the delivery of water from the expansion vessel, the pressure in the vessel decreases progressively, causing a relative reduction of the flow-rate of the service.

Another critical aspect is that conventional accumulation osmosis systems require a flow regulator in order to set the flow-rate of the concentrate.

However, the flow-rate of the flow regulator is independent from the operational step, such as while filling the vessel or during dispensing.

Accordingly, the flow-rate at the service is determined exclusively by the pressure reached in the expansion vessel.

In other words, in conventional accumulation tanks the hydraulic pressure of the concentrate is not utilized to increase the flow-rate at the service.

Another drawback resides in that conventional accumulation reverse osmosis systems for home use require unions and pipes for the hydraulic connection of the various components.

However, unions inherently entail hydraulic tightness risks, assembly risks and space occupation.

A further drawback is the presence of the UV ray lamp, which requires an electric power supply, with electrical and fire risks linked thereto.

It should also be noted that the first water that is delivered, which was present in the chamber of the sterilizer, after a holding period of just a few hours, has a temperature of more than 30° C., which is unpleasant for the user, due to the heat radiated by the UV ray lamp.

Also, exposure to UV rays is harmful for the eyes of the operator.

US2010/116724 discloses a water on water valve assembly for use in reverse osmosis water filtering systems.

OBJECTS OF THE INVENTION

The aim of the invention is to solve the problems described above, providing an apparatus for treating water or liquids in general that solves the problems of space occupation and reduction of flow-rate at the service that are typical of the expansion vessels of the conventional reverse osmosis systems for home use.

Within the scope of this aim, a particular object of the invention is to provide an apparatus having a tank with a useful capacity of treated water equal to the internal volume of the tank, without the loss of volume due to the pressurized air chamber of conventional expansion vessels.

Another object of the invention is to provide an apparatus that maximizes the flow-rate at the service of the treated water, significantly reducing the flow-rate of the concentrate at the discharge, during the dispensing step.

Another object of the invention is to provide an apparatus that does not require unions and pipes in order to provide the hydraulic circuit that is necessary for the interconnection of the various components.

A further object of the invention is to provide an apparatus that is capable of operating with the mains hydraulic pressure only, eliminating the need for an electric power supply and therefore eliminating all the electrical and fire risks linked thereto.

Another object of the invention is to provide an apparatus that does not require a UV ray lamp and solves the problems linked to the increase in the temperature of the water stored in the chamber of the sterilizer, while ensuring the microbiological safety of the treated water.

Another object of the invention is to provide an apparatus that is compact, has minimum space occupation and at the same time simplifies periodic maintenance activities.

SUMMARY OF THE INVENTION

This aim, these objects and others that will become better apparent hereinafter are achieved by an apparatus for treating water or liquids in general, comprising a reverse osmosis filtration device provided with at least one inlet associated with a line for supplying the liquid to be treated, at least one permeate outlet associated with a line for dispensing the treated liquid and at least one concentrate outlet, associated with a line for discharging the waste; said apparatus being characterized in that it comprises, downstream of said filtration device, at least one tank having two adjacent chambers with a mutually variable volume; one of said chambers being connected to said delivery line, the other one of said chambers being connected to said discharge line.

BRIEF DESCRIPTION OF THE DRAWINGS

Further characteristics and advantages will become better apparent from the description of preferred but not exclusive embodiments of an apparatus for treating water or liquids in general, illustrated by way of non-limiting example in the accompanying drawings, wherein.

DETAILED DESCRIPTION

With reference to the cited figures, an apparatus for treating water or liquids in general, globally designated by the reference numeral 1, has a filtration device 2 of the reverse osmosis type, which has an inlet 3, connected to a line 4 for supplying the liquid to be treated, a permeate outlet 5, associated with a line 6 for delivering the treated liquid, and a concentrate outlet 7, which is associated with a line 8 for discharging the waste.

Conveniently, the lines are provided with respective couplings that allow to install the apparatus 1 easily and with a practically nil error margin.

According to a preferred embodiment of the invention, the filtration device 2 consists of two osmosis membranes, designated respectively by the numerals 2a and 2b and connected in series to each other.

The osmosis membranes 2a and 2b are constituted by various layers of selectively permeable membrane that is wound and jacketed in quick-connection cartridges.

According to the present invention, the apparatus 1 has a tank 9 adapted to accumulate a quantity of treated liquid that is substantially equal to all of its internal volume, i.e., without the loss of volume that is due to the presence of a pressurized air chamber provided in traditional expansion vessels.

The tank 9 has two adjacent chambers with a mutually variable volume, designated by 9a and 9b, which are connected respectively to the delivery line 6 and to the discharge line 8.

According to a first embodiment, the tank 9 is constituted by a substantially non-deformable enclosure 10, which contains a membrane 11 made of elastic and waterproof material.

The membrane 11 separates the two chambers 9a and 9b, so that the increase in volume of the former corresponds to a reduction in volume of the latter and vice versa.

According to the illustrated embodiment, the enclosure 10 is constituted by a cup that is detachably mounted on a base 12 that supports substantially all the components of the apparatus 1.

The membrane 11 is constituted by a sort of bag made of elastomeric material, which is fixed to the base 12 by means of a flange 13.

In this embodiment, the chamber 9a corresponds to the space inside the membrane 11, while the chamber 9b corresponds to the space outside the membrane 11 comprised in the enclosure 10.

However, it should be considered that, according to a further aspect of the invention, the two chambers 9a and 9b might be swapped.

A first opening 14 leads into the chamber 9a and has a fluid connection with the permeate outlet 5. A second opening 15 leads into the chamber 9b and has a fluid connection with the concentrate outlet 7. A third opening 16 leads into the chamber 9b and is associated with the discharge line 8.

In practice, the permeate flows into the chamber 9a through the first opening 14, while the concentrate enters the chamber 9b by means of the second opening 15 and is discharged through the third opening 16.

Advantageously, the first opening 14, the second opening 15 and the third opening 16 are provided in the base 12.

It is important to note that, upstream of the second opening 15, there is a first flow control means 17 that adjusts the flow of concentrate in the chamber 9b.

In greater detail, the first flow control means 17 is constituted by a shutoff valve, which can pass from a closed condition, in which it affects the flow of the concentrate when dispensing of treated liquid is not required, to an open condition, in which the concentrate is free to flow in the chamber 9b when the user device requires treated liquid.

Also, downstream of the third opening 16, there is a second flow control means 18, which adjusts the outflow of the concentrate from the chamber 9b toward the discharge.

The second flow control means 18 consists of a flow control element 19 that cooperates with a seat 20 provided in the base 12, substantially at the third opening 16.

The flow control element 19 can gradually pass from a closed position, in which it affects the flow of the concentrate from the chamber 9b toward the discharge, to an open position, in which the concentrate is free to flow.

In the closed position, the flow control element 19 rests on the seat 20, biased by an elastic means 21.

In the illustrated example, the flow control element 19 is constituted by a piston, while the elastic means 21 is constituted by a spring.

According to a further aspect of the invention, the flow control element 19 is constituted by an elastomeric ball, while the elastic means 21 is constituted by another elastically deformable element.

The apparatus 1 also has a mixing means 22 that is interposed between the delivery line 6 and the discharge line 8 that supplies the chamber 9b in order to raise the saline content of the dispensed liquid according to the requirements of the user.

Advantageously, the mixing means 22 comprises a first one-way valve 23 arranged in series with a mixing valve 24.

According to another important aspect of the invention, the apparatus 1 has a special post-filtration means 25 which is connected to the dispensing line 6 downstream of the tank 9.

The post-filtration means 25 includes a cartridge filter 26, which has at least one carbon filtration stage 27 followed by at least one ultrafiltration stage 28.

The two stages are contained in an enclosure that is formed by a cup 29 closed by a dome 30 with a quick coupling system 31.

In the illustrated example, the two stages are mutually superimposed and are separated by a plate 32 with a radial seal.

According to a further aspect of the invention, the two stages may be arranged coaxially.

Conveniently, the post-filtration means 25 also includes a first automatic flow control valve 33 for changing the cartridge filter 26. The control valve 33 is arranged upstream of the filter. The post-filtration means 25 also includes a second one-way valve 34, which is arranged downstream of the cartridge filter 26.

The apparatus 1 may also comprise a pre-filtration means 35 which is connected to the supply line 4 upstream of the filtration device 2.

The pre-filtration means 35 includes an activated carbon filter 36 with a quick coupling system 44.

It is important to note that the two quick coupling systems 31 and 44 are designed so as to prevent accidental swapping of the cartridge filter 26 with the activated carbon filter 36.

Conveniently, the pre-filtration means 35 also includes a second automatic flow control valve 37 for changing the activated carbon filter 36. The second automatic flow control valve 37 is arranged upstream of the filter. The pre-filtration means 35 also includes a third one-way valve 38, which is arranged downstream of the activated carbon filter 36.

Another very important aspect of the invention relates to the fact that the base 12, in addition to supporting substantially all the components of the apparatus 1, comprises an integrated hydraulic circuit that allows to hydraulically connect the components.

Figure 1:
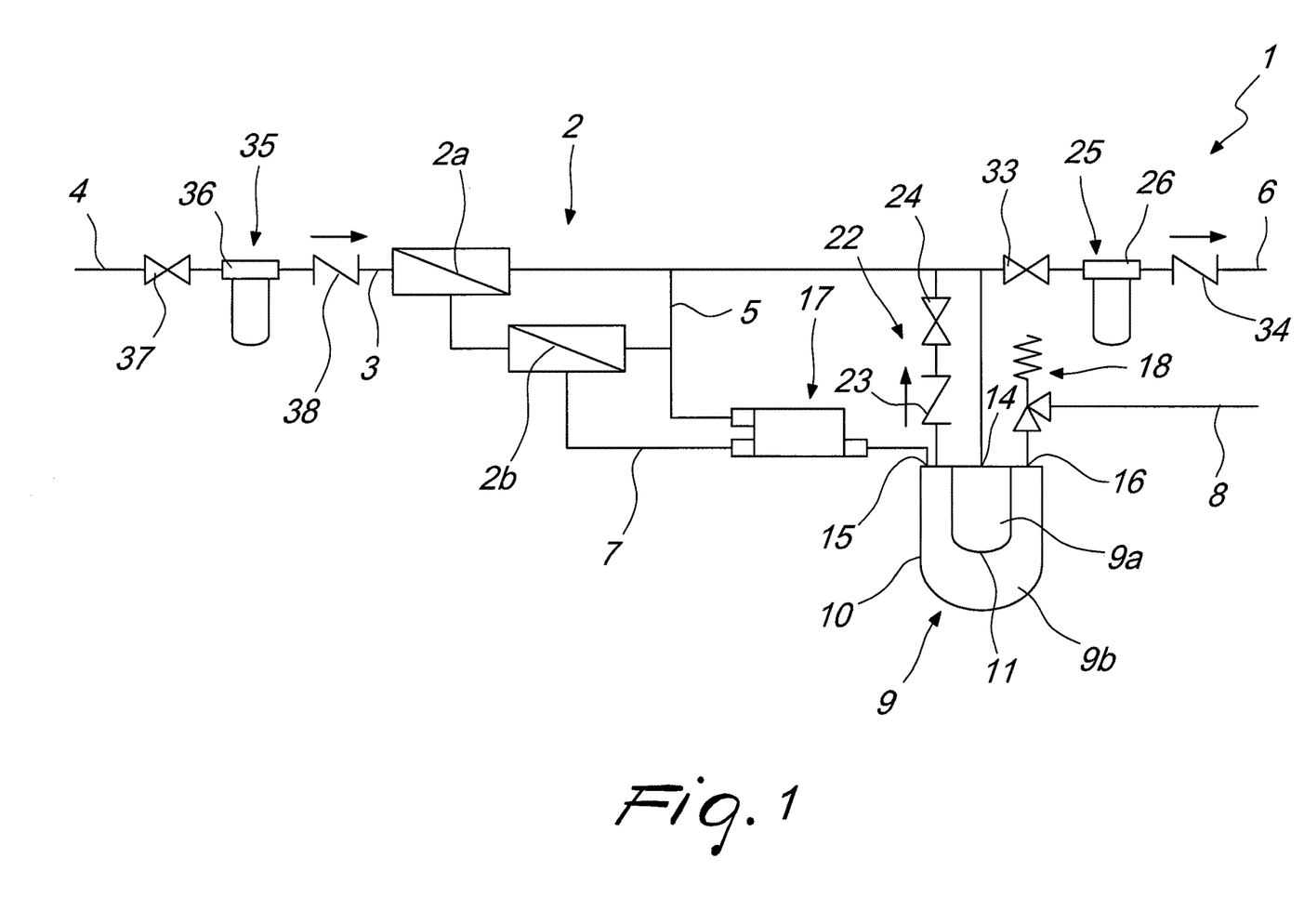
FIG. 1 is a schematic view of an apparatus for treating water or liquids in general, according to the invention.
Figure 2:
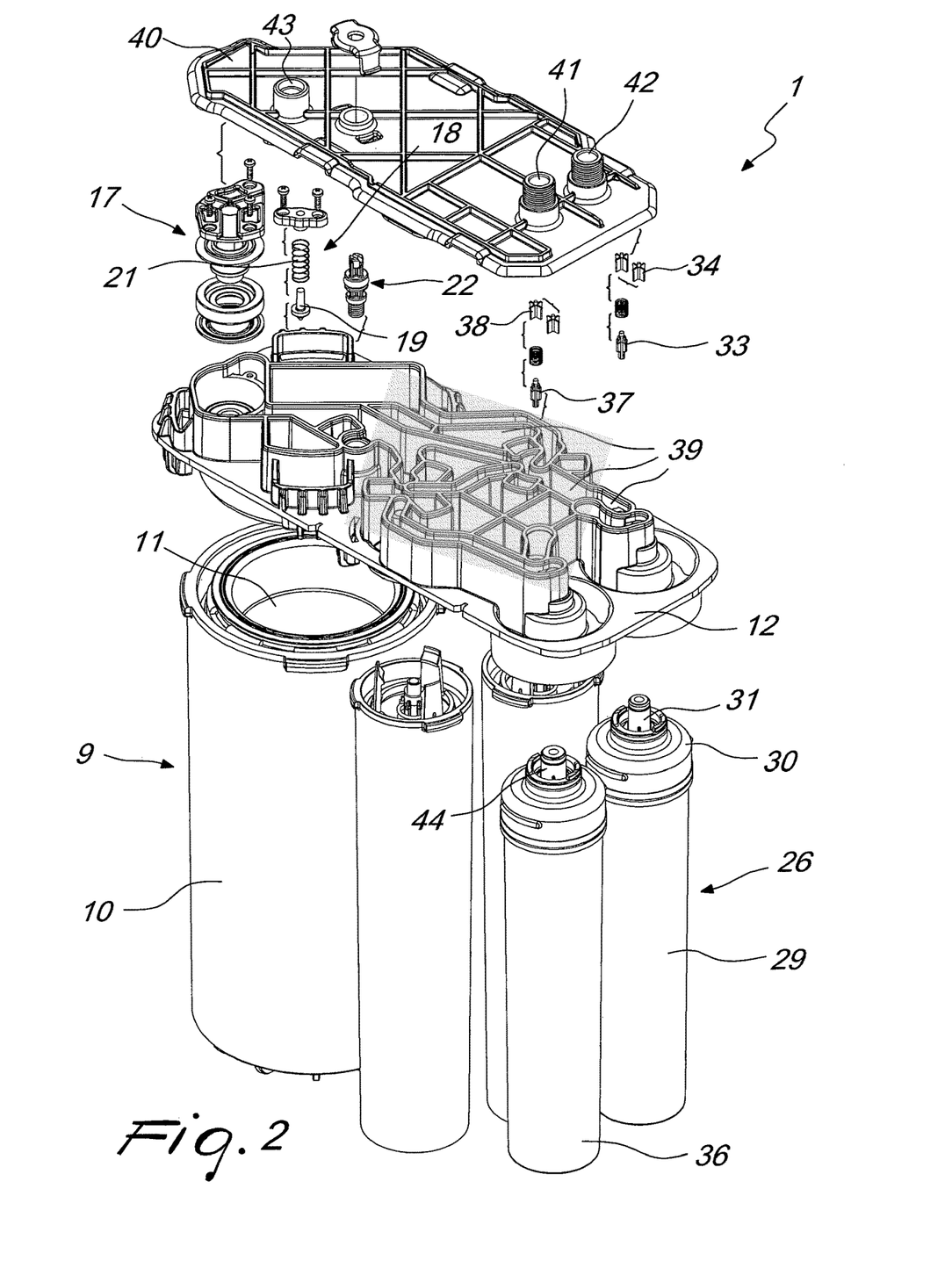
FIG. 2 is an exploded view of an apparatus according to the invention.
Figure 3:
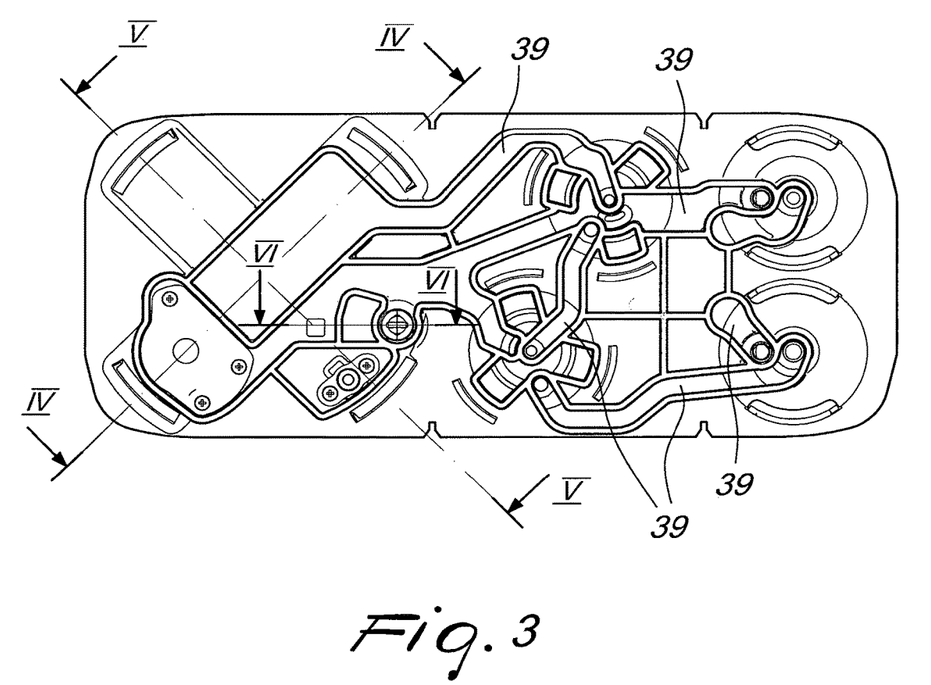
FIG. 3 is a plan view of the apparatus according to the invention.
Figure 4:
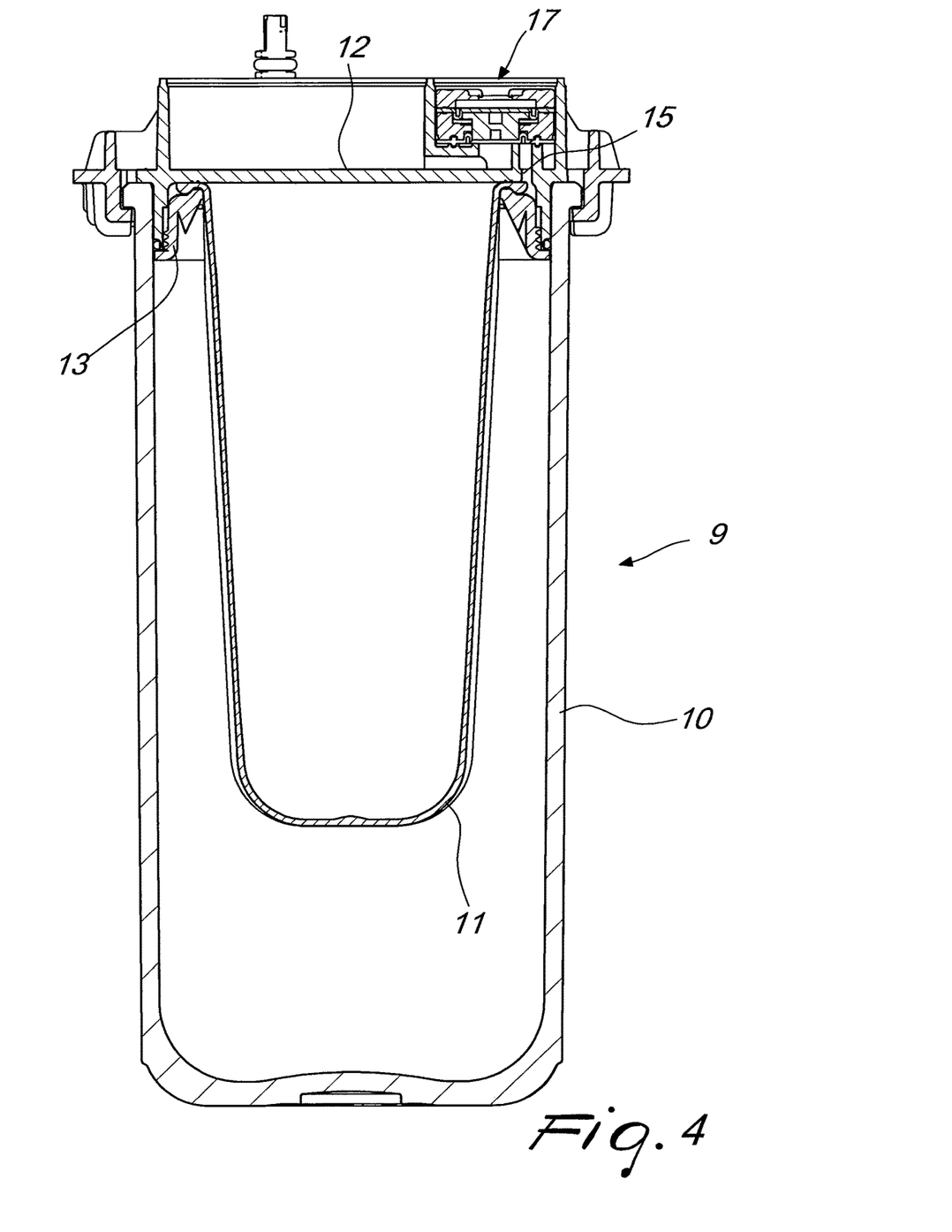
FIG. 4 is a sectional view taken along the plane IV-IV of FIG. 3.
Figure 5:
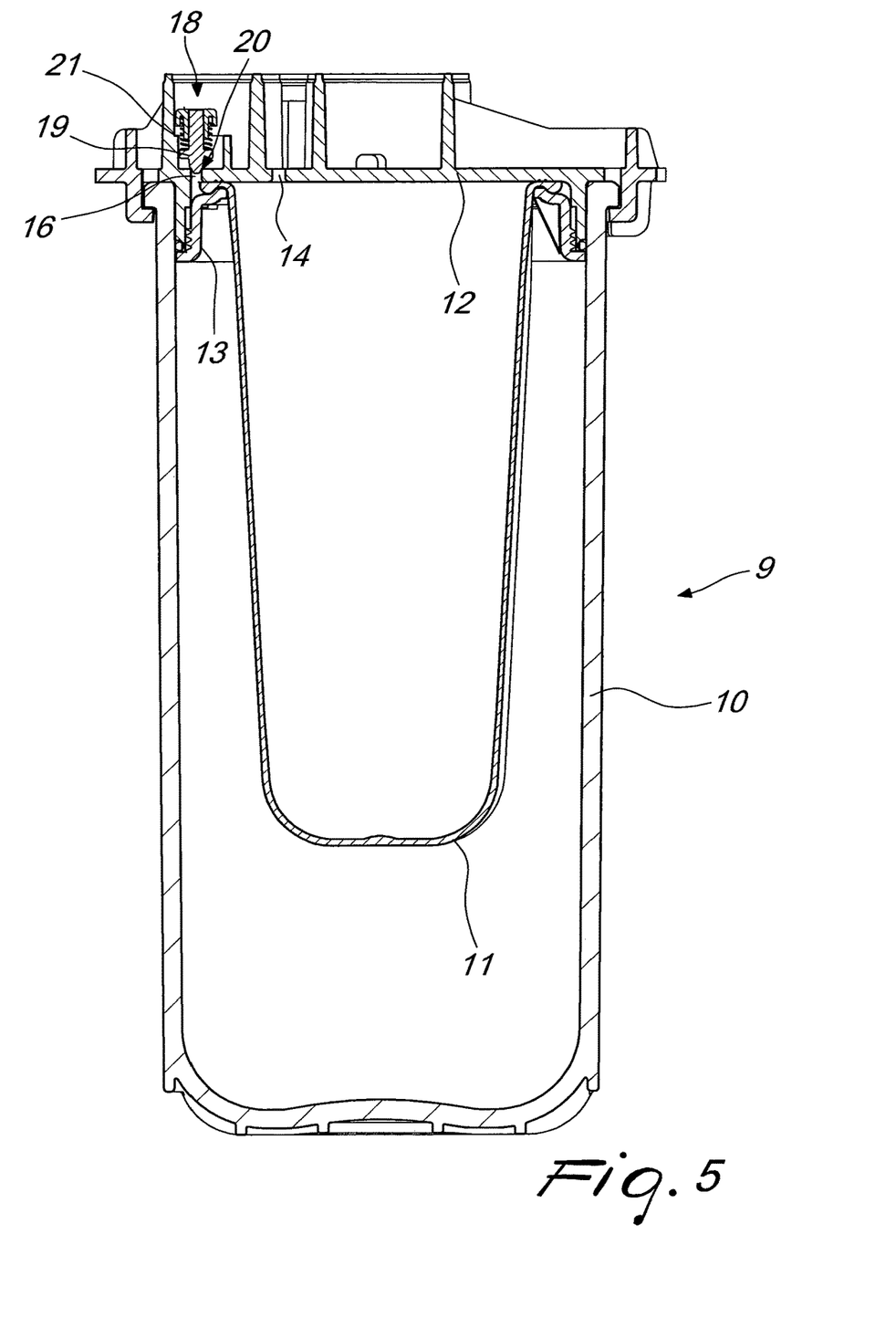
FIG. 5 is a sectional view taken along the plane V-V of FIG. 3.
Figure 6:
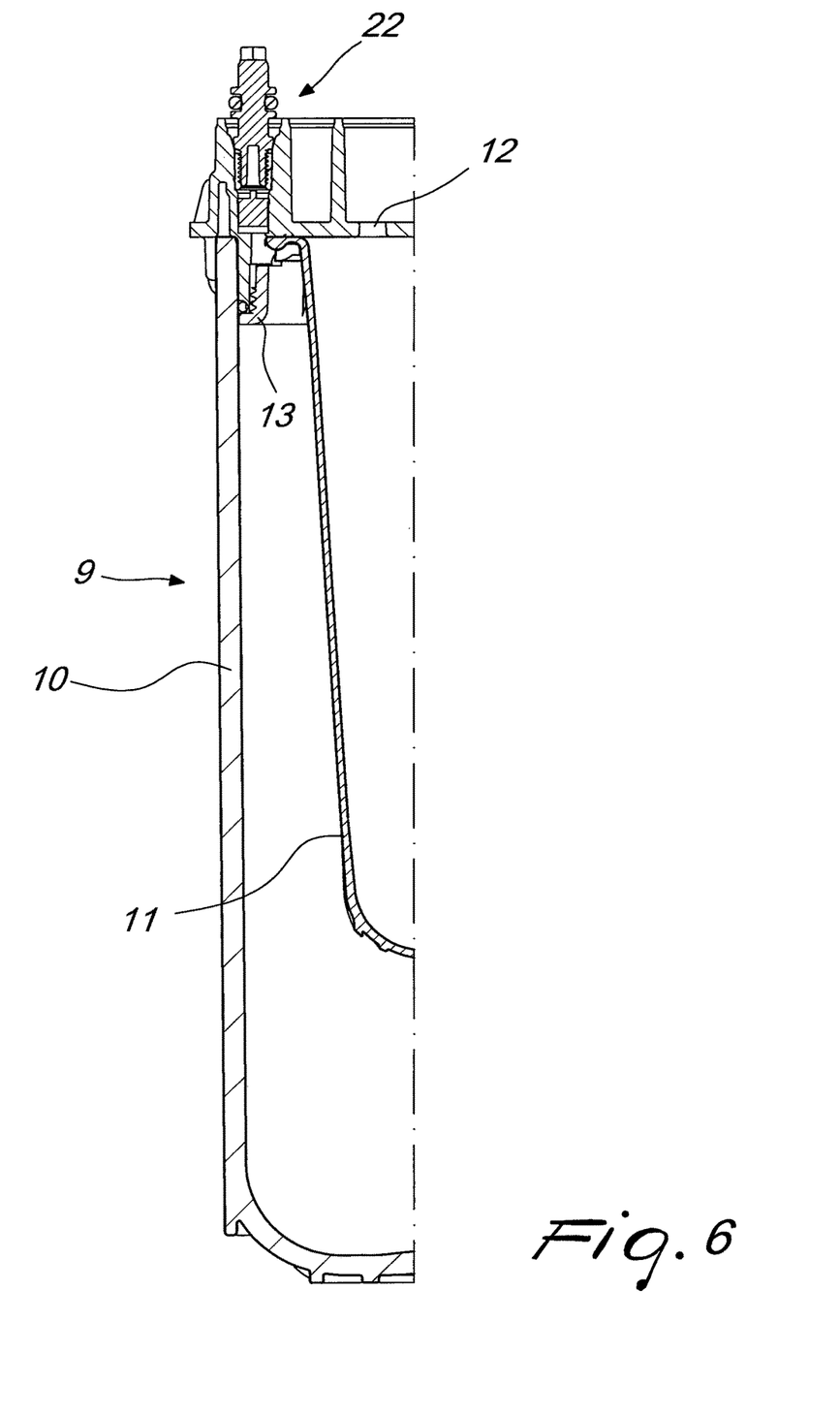
FIG. 6 is a sectional view taken along the plane VI-VI of FIG. 3.
Figures 7, 8:
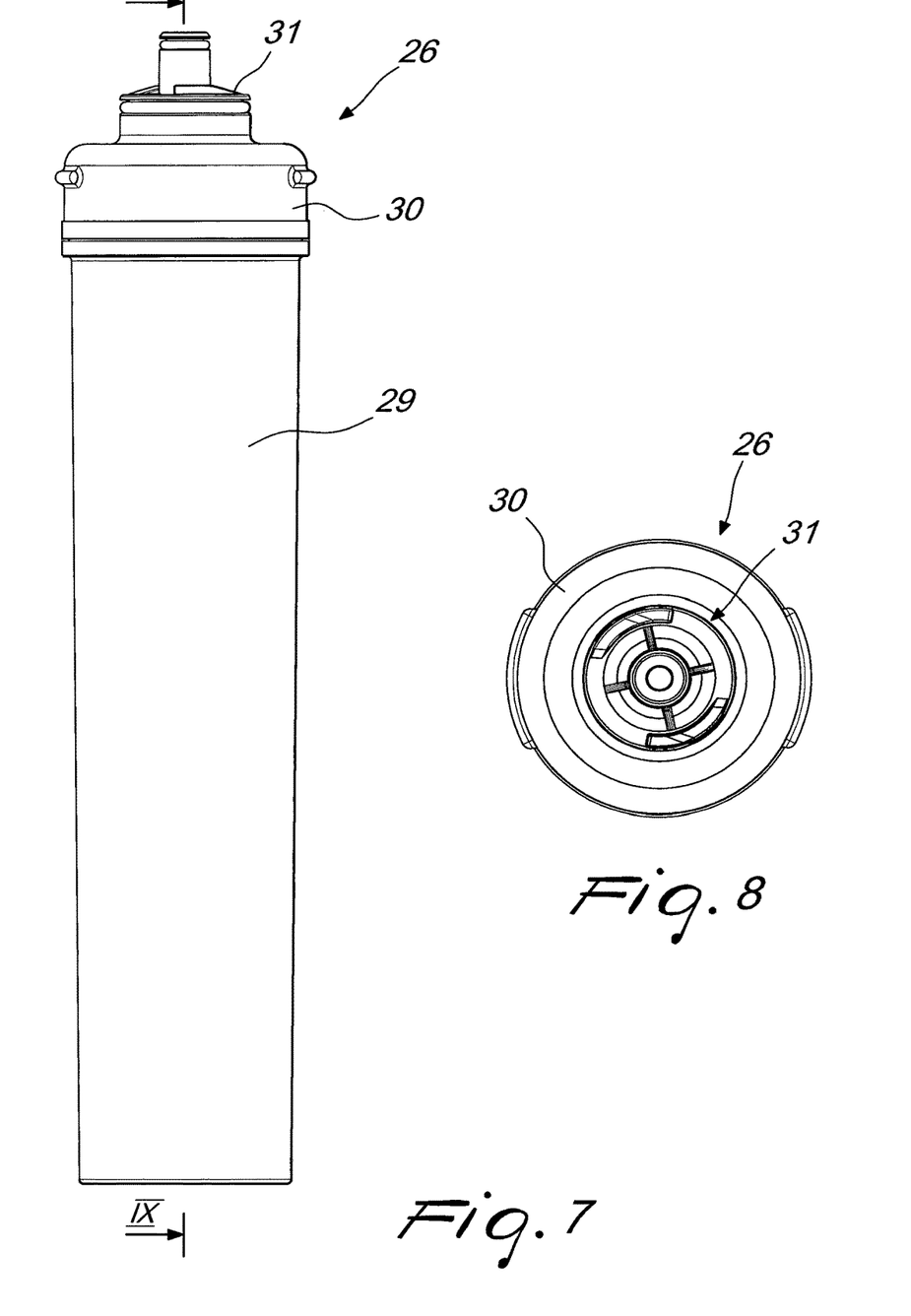
FIG. 7 is a side view of a component of the apparatus according to the invention.
FIG. 8 is a plan view of the component of the preceding figure.
Figure 9:
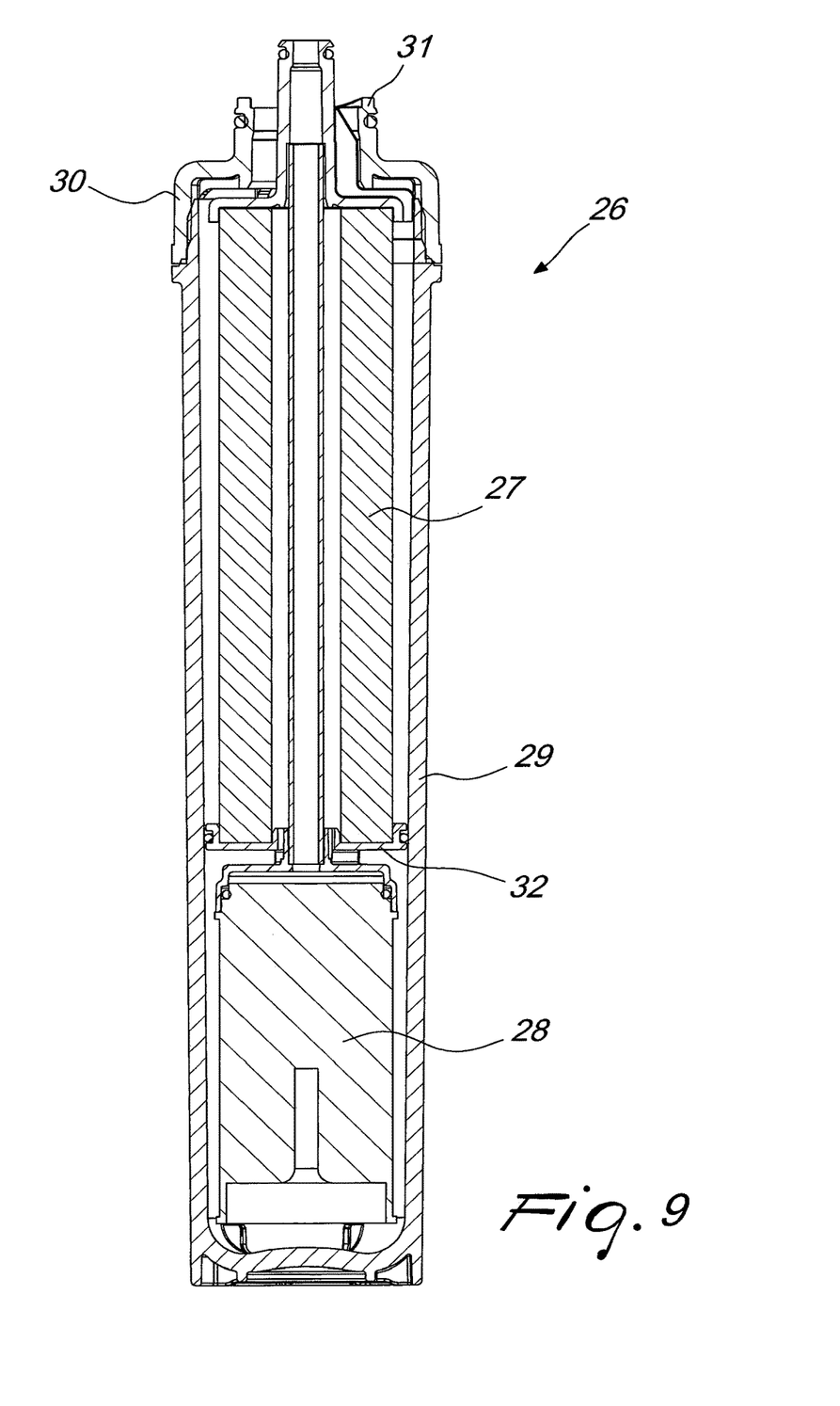
FIG. 9 is a sectional view taken along the plane IX-IX of FIG. 7.

More particularly, in the base 12 there is a set of ducts 39 having various shapes and dimensions and connecting the components of the apparatus 1 according to what has been described, or according to what is shown schematically in FIG. 1.

In other words, the first flow control means 17, the second flow control means 18, the mixing means 22, the automatic flow control valves 33 and 37 and the one-way valves 23, 34 and 38 are integrated in the base 12.

The remaining components, such as the cartridge filter 26 and the activated carbon filter 36, the filtration device 2 and the tank 9 with the membrane 11 are fixed to one side of the base 12, by virtue of quick couplings.

This solution allows to provide the entire circuit without resorting to pipes and unions, thus giving it greater compactness and considerably reducing the hydraulic tightness risks.

In the illustrated embodiment, a cover 40 is welded to the base 12 and the couplings of the inlet 3, of the permeate outlet 5 and of the concentrate outlet 7, designated respectively by 41, 42 and 43, are provided therein.

According to a further aspect of the invention, the base 12 may be constituted by a plate, wherein the ducts 39 are obtained by stamping.

According to a further aspect of the invention, not shown in the figures, the tank is constituted by a substantially non-deformable enclosure inside which a piston with a radial seal is accommodated and can slide with respect to the enclosure.

The piston forms two chambers with mutually variable volume, which can be connected substantially as described above.

The operation of the apparatus for treating water or liquids in general according to the invention is now explained briefly.

During dispensing, the liquid to be treated flows first in the pre-filtration means 35, which removes from it the suspended substances and the organic pollutants and the chlorine-based components.

The liquid then flows into the filtration device 2, which separates the permeate from the concentrate.

The permeate, during the delivery step, flows in the post-filtration means 25 and then reaches the coupling 42, as long as there is demand by the user device.

The degree of salinity of the treated liquid can be raised according to the requirements of the user by virtue of the mixing means 22.

Once delivery has ended, the permeate begins to flow in the chamber 9a of the tank 9, filling the membrane 11 until it occupies substantially all of the internal volume of the tank 9.

The filling of the chamber 9a causes the corresponding emptying of the chamber 9b with the outflow of the concentrate contained therein through the second flow control means 18.

In these conditions, the first flow control means 17 affects the flow of the concentrate, preventing it from flowing in the chamber 9b of the tank.

Once the filling of the chamber 9a has been completed, the apparatus 1 stops producing permeate and remains in a standby condition until a new delivery request occurs.

At the subsequent request for treated liquid, the production of permeate and concentrate by the filtration device 2 resumes.

The permeate once again flows in the post-filtration means 25 in order to reach the coupling 42 with delay.

The concentrate enters the first flow control means 17 which, by virtue of the pressure conditions that are present, allows it to flow in the chamber 9b of the tank 9 until it fills it completely.

The filling of the chamber 9b causes the mutual emptying of the chamber 9a, filled previously, inducing the permeate contained therein to flow in the post-filtration means 25 to then reach the coupling 42, where it is dispensed.

Part of the concentrate in any case flows toward the discharge by virtue of the second flow control means 18, which maximizes the flow-rate of the permeate, significantly reducing the flow-rate at the discharge, during the dispensing step, and compressing the membrane 11 of the tank 9 as quickly as possible.

The time required for the emptying of the chamber 9a substantially corresponds to the time required by the apparatus 1 to resume its normal permeate production and delivery condition.

The apparatus according to the invention therefore allows to solve the problems of flow-rate reduction at the service typical of reverse osmosis systems of the known type.

This invention allows to provide a tank with a useful capacity of treated water that is equal to the internal volume of the tank, without the volume loss due to the pressurized air chamber that is present in traditional expansion vessels.

Another advantage is that the present invention eliminates the need for unions and piping in order to provide this hydraulic circuitry required for the interconnection of the components in accumulation reverse osmosis systems for residential use.

A further important advantage resides in that the apparatus according to the invention operates exclusively with the hydraulic pressure of the mains, thus eliminating not only the need for an electric power supply but also all the electrical and fire risks linked thereto.

In practice, therefore, it has been found that the apparatus for treating water or liquids in general according to the invention fully achieves the intended aim and objects.

In practice, the materials used, so long as they are compatible with the specific use, as well as the contingent shapes and dimensions, may be any according to the requirements and the state of the art.

This application claims the priority of Italian Patent Application No. VI2014A000112, filed on Apr. 16, 2014, the subject matter of which is incorporated herein by reference.

The invention claimed is:

1. An apparatus for treating water or liquids in general, comprising a reverse osmosis filtration device provided with at least one inlet associated with a line for supplying the liquid to be treated, at least one permeate outlet associated with a delivery line for dispensing the treated liquid and at least one concentrate outlet, associated with a discharge line for discharging the waste; said apparatus further comprising, downstream of said filtration device, at least one tank having two adjacent chambers with a mutually variable volume; one of said chambers being connected to said delivery line, the other one of said chambers being connected to said discharge line, said tank including a substantially non-deformable enclosure that contains an elastic and waterproof membrane that is adapted to separate said two adjacent chambers, said one of said chambers being provided with a first opening which has a fluid connection to said permeate outlet, said other one of said chambers being provided with a second opening with a fluid connection to said concentrate outlet and with a third opening associated with said discharge line, said apparatus further comprising:

at least one shut-off valve arranged upstream of said second opening, said at least one shutoff valve being adapted to pass from at least one closed condition, in which it interrupts the fluid connection between said concentrate outlet and said second opening, to at least one open condition, in which the fluid connection is not interrupted, the transition from said closed condition to said open condition being controlled by pressure variations of said delivery line; and a spring-loaded valve arranged downstream of said third opening, said spring-loaded valve comprising a seat, provided substantially at said third opening, which cooperates with a flow control element that can move between at least one closed position, in which it interrupts the fluid connection between said third opening and said discharge line, and at least one open position, in which the fluid connection is not interrupted, the transition from said closed position to said open position being opposed by an elastic means.

2. The apparatus according to claim 1, wherein said enclosure is substantially cup-shaped and said membrane is substantially bag-shaped; said membrane is associated with said enclosure so that said two chambers are arranged one inside the other.

3. The apparatus according to claim 1, further comprising a mixing valve interposed between said delivery line and said discharge line.

4. The apparatus according to claim 3, wherein said mixing valve is connected in series with a first one-way valve; said one-way valve being having an inlet connected to said other one of said chambers, the outlet of said mixing valve being connected to said delivery line.

5. The apparatus according to claim 1, further comprising a filter that is connected to said delivery line and is arranged downstream of said tank.

6. The apparatus according to claim 5, wherein said a filter includes at least one carbon filtration stage followed by at least one ultrafiltration stage.

7. The apparatus according to claim 1, further comprising a filter that is connected to said supply line and is arranged upstream of said reverse osmosis filtration device.

8. The apparatus according to claim 1, further comprising an integrated hydraulic circuit that connects components of said apparatus, said integrated hydraulic circuit comprising a set of ducts provided within a base supporting said components.

9. The apparatus according to claim 1, wherein said filtration device comprises at least one pair of osmosis membranes arranged in series to each other.

* * * * *